United States Patent
Patel et al.

(10) Patent No.: US 11,175,842 B2
(45) Date of Patent: Nov. 16, 2021

(54) METHOD AND SYSTEM FOR PERFORMING DATA DEDUPLICATION IN A DATA PIPELINE

(71) Applicant: Dell Products L.P., Hopkinton, MA (US)

(72) Inventors: Dharmesh M. Patel, Round Rock, TX (US); Ravikanth Chaganti, Bangalore (IN); Rizwan Ali, Cedar Park, TX (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 16/810,936

(22) Filed: Mar. 6, 2020

(65) Prior Publication Data

US 2021/0278981 A1 Sep. 9, 2021

(51) Int. Cl.
*G06F 3/06* (2006.01)

(52) U.S. Cl.
CPC .......... *G06F 3/0641* (2013.01); *G06F 3/0608* (2013.01); *G06F 3/0659* (2013.01); *G06F 3/0673* (2013.01)

(58) Field of Classification Search
CPC .... G06F 3/0641; G06F 3/0608; G06F 3/0659; G06F 3/0673
See application file for complete search history.

(56) References Cited

U.S. PATENT DOCUMENTS

| | | | |
|---|---|---|---|
| 4,780,809 A | 10/1988 | Woffinden et al. | |
| 6,098,098 A | 8/2000 | Sandahl et al. | |
| 7,636,814 B1 | 12/2009 | Karr et al. | |
| 7,987,353 B2 | 7/2011 | Holdaway et al. | |
| 8,099,571 B1 | 1/2012 | Driscoll et al. | |
| 8,161,255 B2 | 4/2012 | Anglin et al. | |
| 8,190,835 B1 | 5/2012 | Yueh | |
| 8,364,917 B2 | 1/2013 | Bricker et al. | |
| 8,386,930 B2 | 2/2013 | Dillenberger et al. | |
| 8,583,769 B1 | 11/2013 | Peters et al. | |
| 8,788,466 B2 | 7/2014 | Anglin et al. | |
| 8,868,987 B2 | 10/2014 | Wagner | |
| 8,874,892 B1 | 10/2014 | Chan et al. | |
| 8,898,114 B1 | 11/2014 | Feathergill et al. | |
| 8,949,208 B1 | 2/2015 | Xu et al. | |
| 9,122,501 B1 | 9/2015 | Hsu et al. | |
| 9,176,679 B2 | 11/2015 | Oberhofer et al. | |

(Continued)

FOREIGN PATENT DOCUMENTS

WO 2015114643 A1 8/2015

OTHER PUBLICATIONS

"Features—RoboHead"; Project Management Software for Marketing & Creative Teams, Aquent; 2018 (https://www.robohead.net/features) 1 page).

(Continued)

*Primary Examiner* — Tuan V Thai
(74) *Attorney, Agent, or Firm* — Chamberlain, Hrdlicka, White, Williams & Aughtry

(57) ABSTRACT

In general, the invention relates to a method for processing data. The method includes receiving a write request from a host, and in response to the write request, obtaining system metadata for a system, selecting, based on the system metadata, a selected component of the system to perform a data processing operation, and initiating the data processing operation on the selected component.

11 Claims, 12 Drawing Sheets

(56) References Cited

U.S. PATENT DOCUMENTS

| | | |
|---|---|---|
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala et al. |
| 9,710,367 B1 | 7/2017 | Nagineni |
| 9,749,480 B1 | 8/2017 | Katano |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic et al. |
| 10,097,620 B2 | 10/2018 | Reddy et al. |
| 10,152,254 B1 | 12/2018 | Kang et al. |
| 10,185,624 B2 | 1/2019 | Akutsu et al. |
| 10,241,695 B2 | 3/2019 | Baptist et al. |
| 10,339,455 B1 | 7/2019 | Parush-Tzur et al. |
| 10,353,596 B2 | 7/2019 | Zhou |
| 10,409,778 B1 | 9/2019 | Zhao et al. |
| 10,452,301 B1* | 10/2019 | Farhan ............... G06F 12/0866 |
| 10,503,413 B1 | 12/2019 | Gal et al. |
| 10,503,611 B1 | 12/2019 | Srivastav et al. |
| 2001/0044879 A1 | 11/2001 | Moulton et al. |
| 2003/0036882 A1 | 2/2003 | Harper et al. |
| 2003/0058277 A1 | 3/2003 | Bowman-Amuah |
| 2003/0065873 A1 | 4/2003 | Collins et al. |
| 2003/0172145 A1 | 9/2003 | Nguyen |
| 2003/0177205 A1 | 9/2003 | Liang et al. |
| 2004/0128587 A1 | 7/2004 | Kenchammana-Hosekote et al. |
| 2005/0076049 A1 | 4/2005 | Qubti et al. |
| 2005/0262385 A1 | 11/2005 | Mcneill, Jr. et al. |
| 2007/0283011 A1 | 12/2007 | Rakowski et al. |
| 2008/0244204 A1 | 10/2008 | Cremelie et al. |
| 2009/0077165 A1 | 3/2009 | Rhodes et al. |
| 2009/0094250 A1 | 4/2009 | Dhuse et al. |
| 2009/0265360 A1 | 10/2009 | Bachwani et al. |
| 2011/0099351 A1 | 4/2011 | Condict |
| 2011/0246597 A1 | 10/2011 | Swanson et al. |
| 2012/0096309 A1 | 4/2012 | Kumar et al. |
| 2013/0067459 A1 | 3/2013 | Sannidhanam et al. |
| 2013/0086006 A1* | 4/2013 | Colgrove ............ G06F 16/1752 707/692 |
| 2013/0151683 A1 | 6/2013 | Jain et al. |
| 2013/0339818 A1 | 12/2013 | Baker et al. |
| 2014/0020083 A1 | 1/2014 | Fetik |
| 2014/0297603 A1 | 10/2014 | Kim et al. |
| 2015/0058582 A1 | 2/2015 | Baldwin et al. |
| 2015/0095596 A1* | 4/2015 | Yang ..................... G06F 3/061 711/162 |
| 2015/0161000 A1 | 6/2015 | Kim et al. |
| 2015/0220400 A1 | 8/2015 | Resch et al. |
| 2015/0286545 A1* | 10/2015 | Brown ................ G06F 11/2079 714/6.23 |
| 2015/0355980 A1 | 12/2015 | Volvovski et al. |
| 2016/0062674 A1 | 3/2016 | Benight et al. |
| 2016/0085630 A1 | 3/2016 | Gardner |
| 2016/0246537 A1 | 8/2016 | Kim |
| 2017/0099187 A1 | 4/2017 | Dale et al. |
| 2017/0147437 A1 | 5/2017 | Borlick et al. |
| 2017/0160983 A1 | 6/2017 | Fiske et al. |
| 2017/0192865 A1 | 7/2017 | Pan |
| 2017/0192868 A1 | 7/2017 | Vijayan et al. |
| 2017/0206034 A1 | 7/2017 | Fetik |
| 2017/0235609 A1 | 8/2017 | Wires et al. |
| 2018/0018235 A1 | 1/2018 | Arslan et al. |
| 2018/0060894 A1 | 3/2018 | Beveridge et al. |
| 2018/0157532 A1 | 6/2018 | Kumar et al. |
| 2018/0189109 A1 | 7/2018 | Nagai et al. |
| 2018/0217898 A1 | 8/2018 | Tormasov |
| 2018/0278597 A1 | 9/2018 | Helms et al. |
| 2018/0307560 A1 | 10/2018 | Vishnumolakala et al. |
| 2018/0322558 A1 | 11/2018 | Padmanabh et al. |
| 2019/0104398 A1 | 4/2019 | Owen et al. |
| 2019/0109772 A1 | 4/2019 | Lipstone et al. |
| 2019/0197023 A1 | 6/2019 | Chennamsetty et al. |
| 2019/0332473 A1 | 10/2019 | Yang et al. |
| 2019/0379588 A1 | 12/2019 | Rao |
| 2020/0050689 A1 | 2/2020 | Tal et al. |

OTHER PUBLICATIONS

"Make more time for the work that matters most"; Asana, Inc.; 2017 (https://asana.com/) (7 pages).

"Online Project Management Tools & Features"; ProWorkflow; Jun. 2015 (https://www.proworkflow.com/features-project-management-tools/) (7 pages).

Extended European Search Report issued in corresponding European Application No. 20152194.5, dated Jun. 29, 2020 (10 pages).

Extended European Search Report issued in corresponding European Application No. 20152195.2, dated Jun. 2, 2020 (6 pages).

Suzhen Wu et al. ;"Improving Reliability of Deduplication-based Storage Systems with Per-File Parity"; 2018 IEEE 37th International Symposium on Reliable Distributed Systems (SRDS); Salvador, Brazil; 2018; pp. 171-180 (DOI:10.1109/SRDS.2018.00028) (10 pages).

* cited by examiner

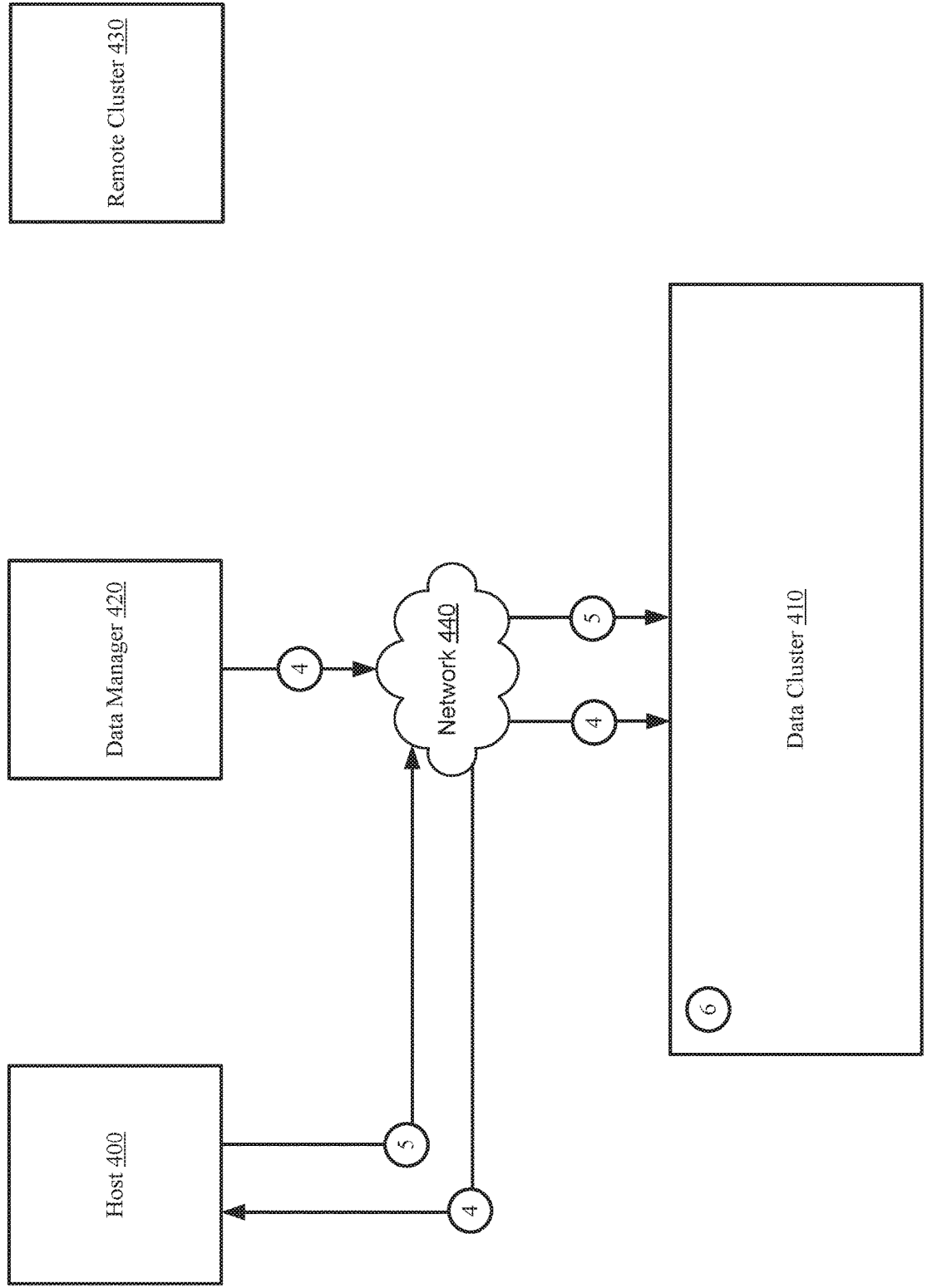

METHOD AND SYSTEM FOR PERFORMING DATA DEDUPLICATION IN A DATA PIPELINE

BACKGROUND

Computing devices may include any number of internal components such as processors, memory, and persistent storage. Each of the internal components of a computing device may be used to generate data. The process of generating and storing data may utilize computing resources of the computing devices such as processing and storage.

SUMMARY

In general, in one aspect, the invention relates to a method for processing data. The method includes receiving a write request from a host, and in response to the write request, obtaining system metadata for a system, selecting, based on the system metadata, a selected component of the system to perform a data processing operation, and initiating the data processing operation on the selected component.

In general, in one aspect, the invention relates to a system that includes a processor and a data manager, which when executed by the processor performs a method. The method comprises receiving a write request from a host, and in response to the write request, obtaining system metadata for a system, selecting, based on the system metadata, a selected component of the system to perform a data processing operation, and initiating the data processing operation on the selected component.

In general, in one aspect, the invention relates to a non-transitory computer readable medium which includes computer readable program code, which when executed by a computer processor enables the computer processor to perform a method. The method includes receiving a write request from a host, and in response to the write request, obtaining system metadata for a system, selecting, based on the system metadata, a selected component of the system to perform a data processing operation, and initiating the data processing operation on the selected component.

BRIEF DESCRIPTION OF DRAWINGS

FIGS. 4A-4B show a first example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for storing data and metadata in a data cluster. More specifically, embodiments of the invention relate to performing deduplication and undeduplication at multiple components in the system. Further, a data manager may use system metadata to determine which component of the system to perform deduplication. Similarly, a data manager may use system metadata to determine which component of the system to perform undeduplication. The component that performs deduplication may not be the same component that performs undeduplication. The data manager may initiate deduplication and undeduplication at the chosen components.

Figure 1A:
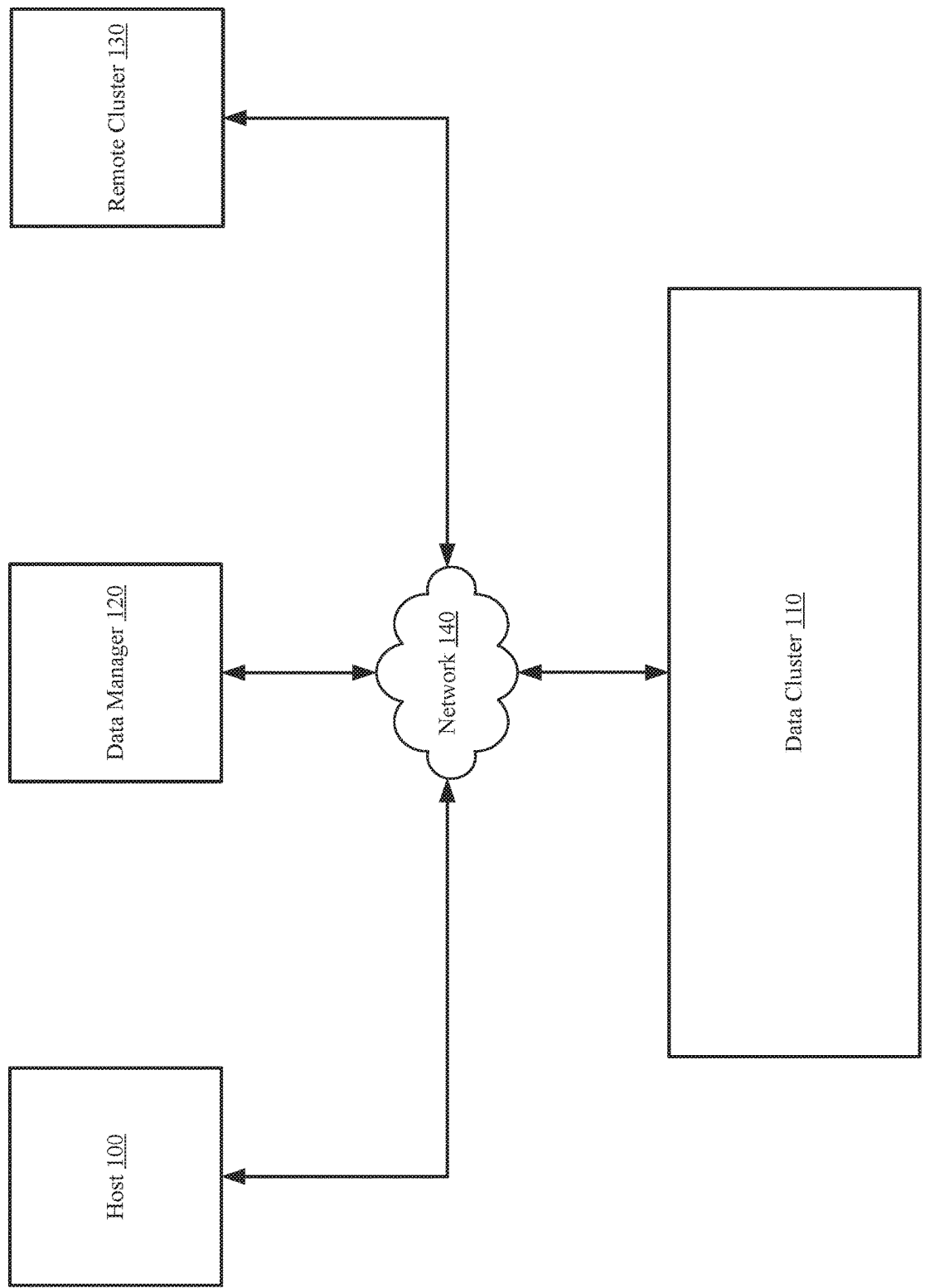
FIG. 1A shows a diagram of a system in accordance with one or more embodiments of the invention.

FIG. 1A shows an example system in accordance with one or more embodiments of the invention. The system may include a host (100), a data cluster (110), a data manager (120), and a remote cluster (130), each may be operatively connected. The system may include other and/or additional components without departing from the invention. Each of the illustrated components is described below.

In one or more embodiments of the invention, the host (100) utilizes the data cluster (110) to store data. The data stored may be backups of databases, files, applications, and/or other types of data without departing from the invention. The host (100) may include the functionality to perform data deduplication and undeduplication.

Figure 5:
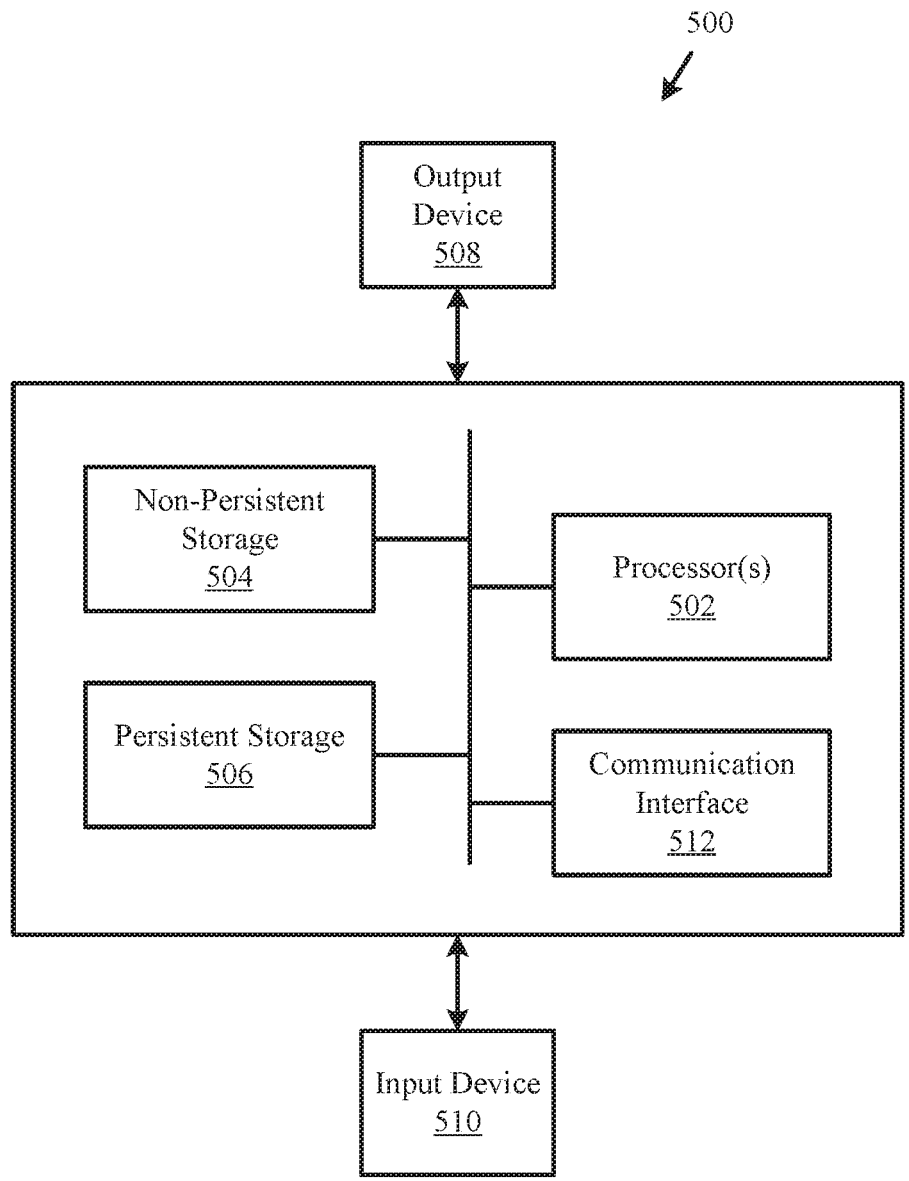
FIG. 5 shows a computing system in accordance with one or more embodiments of the invention.

In one or more embodiments of the invention, the host (100) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the host (100) described throughout this application.

In one or more embodiments of the invention, the host (100) is implemented as a logical device. The logical device may utilize the computing resources of any number of computing devices and thereby provide the functionality of the host (100) described throughout this application.

In one or more embodiments of the invention, the data cluster (110) stores data, metadata, and/or backups of data generated by the host (100). The data and/or backups may be deduplicated versions of data obtained from the host (100) obtained via data deduplication. The data cluster (110) may, via an erasure coding operation, store portions of the deduplicated data across data nodes operating in the data cluster (110). One or more components of the data cluster (110) (see e.g., FIG. 1E) may include the functionality to perform data deduplication and undeduplication.

As used herein, deduplication refers to methods of storing only portions of files (also referred to as file segments or segments) that are not already stored in persistent storage. For example, when multiple versions of a large file, having only minimal differences between each of the versions, are stored without deduplication, storing each version will require approximately the same amount of storage space of a persistent storage. In contrast, when the multiple versions of the large file are stored with deduplication, only the first version of the multiple versions stored will require a substantial amount of storage. Once the first version is stored in the persistent storage, the subsequent versions of the large file subsequently stored will be de-duplicated before being stored in the persistent storage resulting in much less storage space of the persistent storage being required to store the subsequently stored versions when compared to the amount of storage space of the persistent storage required to store the first stored version. Undeduplication refers to methods of restoring files which were deduplicated using the portions of files stored in persistent storage.

Continuing with the discussion of FIG. 1A, the data cluster (110) may include persistent storage devices found within data nodes that each store any number of portions of data. The portions of data may be obtained by other persistent storage devices, data nodes, the host (100) the data manager (120), and the remote cluster (130). For additional details regarding the data cluster (110), see, e.g., FIG. 1B.

In one or more embodiments of the invention, the data manager (120) is a device (physical or logical) that includes the functionality to determine which component of the system to perform deduplication on data obtained from the host (100) and/or undeduplication on deduplicated data stored in the data cluster (110). Additionally, the data manager manages the movement and processing of data within the system along a data pipeline. The data pipeline may refer to a set of data processing elements connected in series where the output of one element is the input of the next. For example, a data pipeline may include the host (100), the network (140) and the data cluster (110). In such a scenario, data that may be generated on the host (100), sent to the network (140) and deduplicated, and then the deduplicated data may be sent and stored in the data cluster (110). For additional details regarding the data manager (120), refer to FIG. 1B.

In one or more embodiments of the invention, the data manager (120) is implemented as a computing device (see e.g., FIG. 5). The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data manager (120) described throughout this application.

In one or more embodiments of the invention, the data manager (120) is implemented as a logical device. The logical device may utilize the computing resources of any number of computing devices and thereby provide the functionality of the data manager (120) described throughout this application. The remote cluster (130) or its components may include the functionality to perform deduplication and undeduplication. For additional details regarding the data manager (120) refer to FIG. 1B.

In one or more embodiments of the invention, the remote cluster (130) obtains and stores data, metadata, and/or backups of data generated by the host (100). The data and/or backups may have been previously stored in the data cluster (110). The data and/or backups may be deduplicated or undeduplicated versions of data obtained from the host (100) obtained via data deduplication. The remote cluster (130) may, via an erasure coding operation, store portions of the deduplicated data across data nodes operating in the remote cluster (130).

The remote cluster (130) may include persistent storage devices found within data nodes that each store any number of portions of data. The portions of data may be obtained from the data cluster (110). The remote cluster (130) may obtain and store the potions of data from the data cluster (110) to provide the portions of data to other components not included in the system of FIG. 1A that do not have access to the data cluster (110) or resulting in the portions of data being more accessible to the other components not included in the system than if the portions of data were stored in the data cluster (110). For additional details regarding the remote cluster (130), see, e.g., FIG. 1D.

In one or more embodiments of the invention, the above-mentioned system components are operatively connect to one another through a network (140) (e.g., a local area network (LAN), a wide area network (WAN) such as the Internet, a mobile network, etc.). The network (140) may be implemented using any combination of wired and/or wireless connections. Further, the network (140) may encompass various interconnected, network-enabled subcomponents (or systems) (e.g., switches, routers, gateways, controllers, etc.) that may facilitate communications between the above-mentioned components. Moreover, the above-mentioned system components may communicate with one another using any combination of wired and/or wireless communication protocols. Additionally, one or more of the aforementioned network subcomponents may include the functionality to perform data deduplication and undeduplication.

Figure 1B:
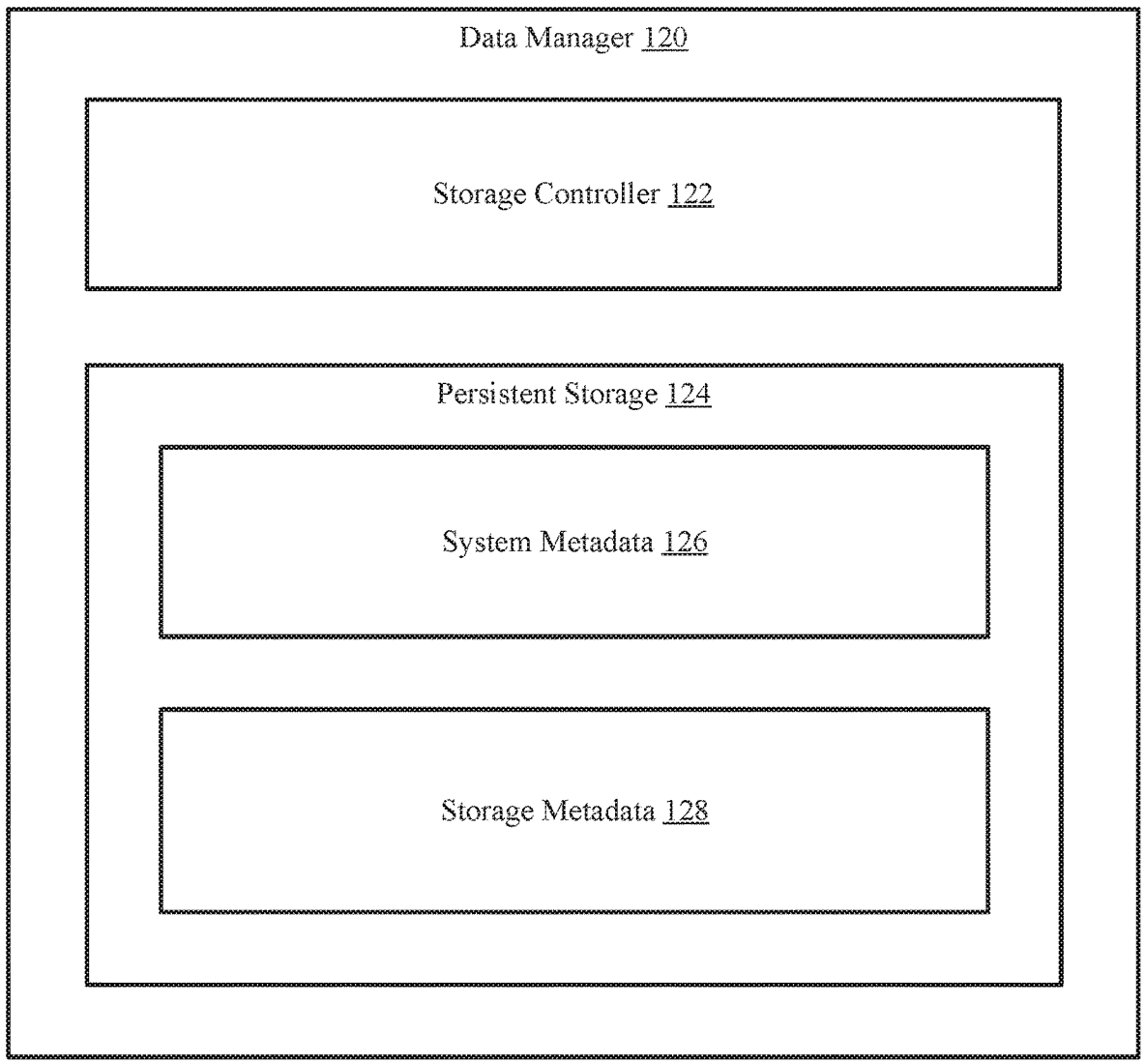
FIG. 1B shows a diagram of a data manager in accordance with one or more embodiments of the invention.

FIG. 1B shows a diagram of a data manager in accordance with one or more embodiments of the invention. The data manager (120) may be an embodiment of the data manager (120, FIG. 1A) described above. The data manager (120) may include a storage controller (122) and persistent storage (124). Each of the components is described below.

In one or more embodiments of the invention, the storage controller (122) requests and obtains system metadata (126, described below) from each component of the system and uses the system metadata (126) to determine which component of the system to perform deduplication and undeduplication. The storage controller (122) may then initiate the performance of deduplication and undeduplication at the selected component(s). Additional detail about various embodiments of the invention related to the functionality of the storage controller is provided in FIGS. 3A and 3B. The storage controller may include other and/or additional functionalities without departing from the invention.

The storage controller (122) may be implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the storage controller (122) described throughout this application and/or all or a portion of the methods illustrated in FIGS. 3A-3B. The storage controller (122) may be another physical device without departing from the invention.

Figure 3A:
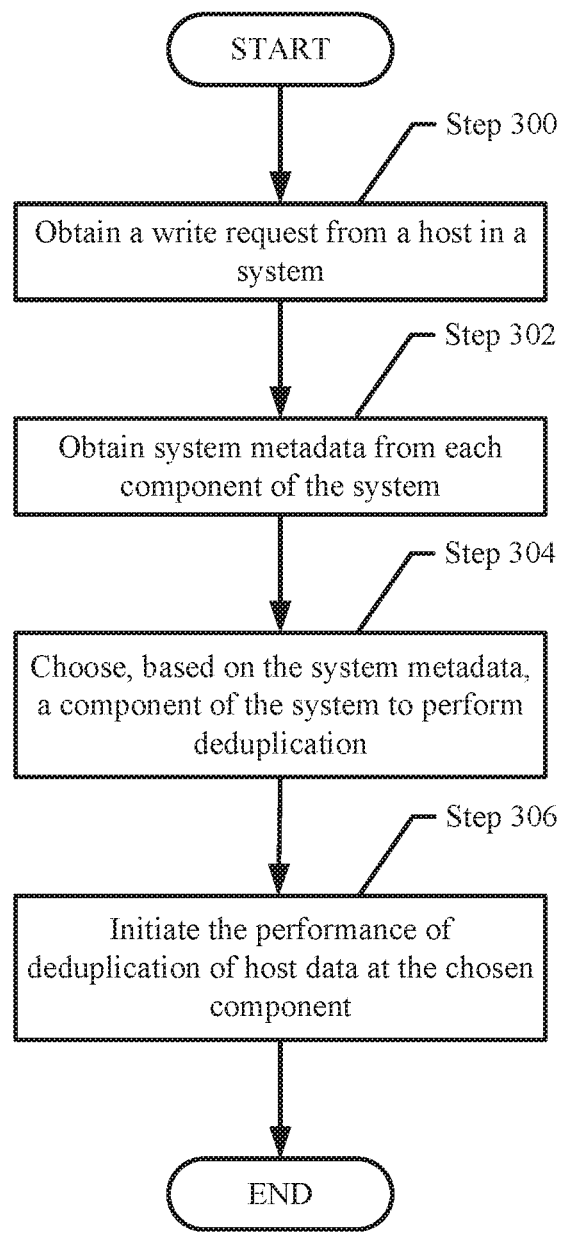
FIG. 3A shows a flowchart for storing data in accordance with one or more embodiments of the invention.
Figure 3B:
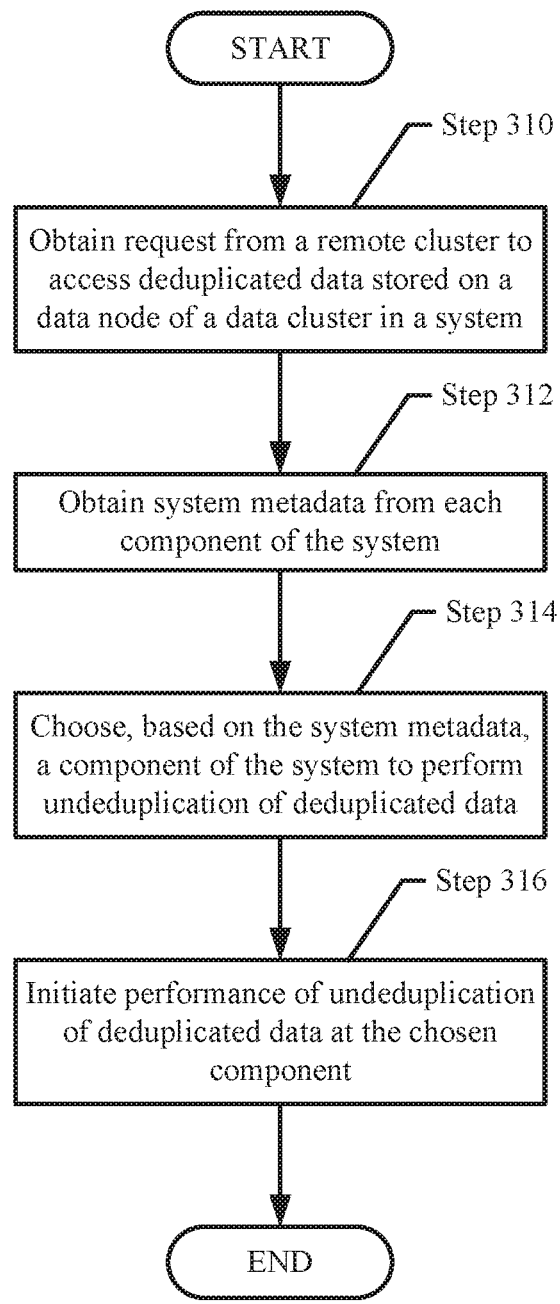
FIG. 3B shows a flowchart for providing data in accordance with one or more embodiments of the invention.

The storage controller (122) may be implemented using computer instructions (e.g., computing code) stored on a persistent storage (e.g., 124) that when executed by a processor of the data manager (120) causes the manager (120) to perform the functionality of the storage controller (122) described throughout this application and/or all or a portion of the methods illustrated in FIGS. 3A-3B.

The storage controller (122) may utilize data structures stored in a persistent storage (124) of the data manager (120). The persistent storage (124) may store data maintained and used by the storage controller (122). The persistent storage (124) may be implemented using a physical storage device. The physical storage device may include any combination of hard disk drives, solid state disk drives, tape drives, and/or any other physical storage mediums for the storage of data. The persistent storage (124) may be another type of physical storage without departing from the invention. In another embodiment of the invention, the persistent storage (124) may be implemented using a logical storage device (e.g., virtualized storage) that utilizes any quantity of hardware storage resources of any number of computing devices for storing data. For example, the persistent storage (124) may utilize portions of any combination of hard disk drives, solid state disk drives, tape drives, and/or any other physical storage medium of any number of computing devices. The persistent storage (124) may be another type of logical storage device without departing from the invention.

The persistent storage (124) may store data structures used by the storage controller (122) as described above. The data structures may include system metadata (126) and storage metadata (128). Each of the data structures is discussed below.

In one or more embodiments of the invention, system metadata (126) includes metadata associated with each component of the system depicted in FIG. 1A. The system metadata (126) may include computational capability information associated with each component of the system and prior performance information. The system metadata (126) may include other and/or additional metadata without departing from the invention. For additional information regarding system metadata (126), refer to FIG. 2.

In one or more embodiments of the invention, storage metadata (128) includes metadata associated with data stored in the system. The storage metadata (128) may include deduplication metadata. The deduplication metadata may include unique identifiers (e.g., fingerprints) for unique data chunks or segments. The deduplication metadata may also include mapping information. Mapping information may, for example, include information that indicates which unique chunks stored in the data cluster (e.g., 110, FIG. 1A) may make up a data file or other form of data that was deduplicated and includes one or more unique data chunks. The mapping information may also include the storage locations (e.g., the data node (e.g., 114A, FIG. 1C) and persistent storage device (e.g., 156A, FIG. 1E)) in which each unique data chunk is stored. The deduplication metadata may include other and/or additional information regarding deduplicated data without departing from the invention. The deduplication metadata may be used to undedupe deduplicated data. The storage metadata may include other and/or additional metadata without departing from the invention.

Figure 1C:
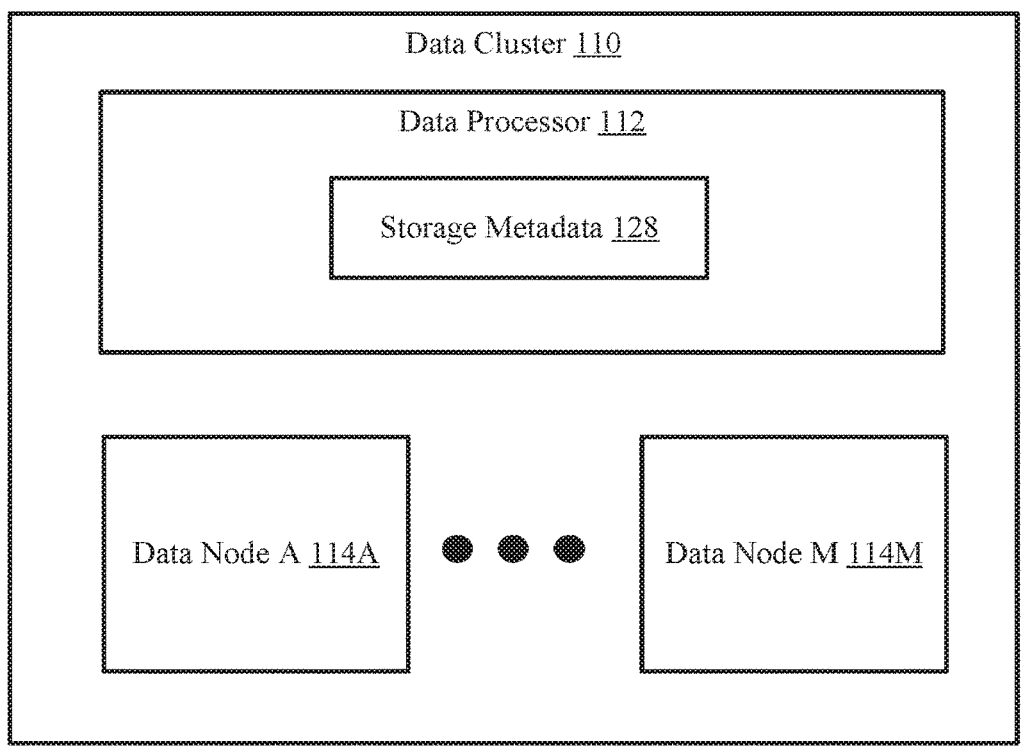
FIG. 1C shows a diagram of a data cluster in accordance with one or more embodiments of the invention.

FIG. 1C shows a diagram of a data cluster in accordance with one or more embodiments of the invention. The data cluster (110) may be an embodiment of the data cluster (110, FIG. 1A) discussed above. The data cluster (110) may include a data processor (112), and any number of data nodes (114A, 114N). The components of the data cluster (110) may be operably connected via any combination of wired and/or wireless connections. Each of the aforementioned components is discussed below. The data cluster (110) may include other and/or additional components without departing from the invention.

In one or more embodiments of the invention, the data processor (112) is a device (physical or logical) that includes the functionality to perform deduplication and undeduplication on data obtained from a host (e.g., 100, FIG. 1A) and manage the storage of the resulting processed data in to the persistent storage devices of data nodes (114A, 114N) in the data cluster (110). The data processor (112) may generate, utilize, and update storage metadata (128) as part of its storage management and data processing functionality. The data processor (112) may send the storage metadata (128) to the data manager (120, FIG. 1A).

In one or more of embodiments of the invention, the data processor (112) is implemented as computer instructions, e.g., computer code, stored on a persistent storage device of a data node (114A, 114N) that when executed by a processor of a data node (e.g., 114A, 114N) cause the data node (114A, 114N) to provide the aforementioned functionality of the data processor (112) described throughout this application.

In one or more embodiments of the invention, the data processor (112) is implemented as a computing device (see e.g., FIG. 5), which is operatively connected to (but is separate from) the data nodes. The computing device may be, for example, a laptop computer, a desktop computer, a server, a distributed computing system, or a cloud resource (e.g., a third-party storage system accessible via a wired or wireless connection). The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data processor (112) described throughout this application.

In one or more embodiments of the invention, the data processor (112) is implemented as a logical device. The logical device may utilize the computing resources of any number of computing devices and thereby provide the functionality of the data processor (112) described throughout this application.

In one or more embodiments of the invention, the data nodes (114A, 114N) store processed data (as described below). The data nodes (114A, 114N) may include persistent storage devices (e.g., see FIG. 1E) that may be used to store the processed data and/or storage metadata. The management of the processed data is described below with respect to FIGS. 3A-3B. The data nodes (114A, 114N) may include the functionality to perform deduplication and undeduplication for the data cluster (110) without departing from the invention. For additional details regarding the data nodes (114A, 114N), see, e.g., FIG. 1E.

Figure 1D:
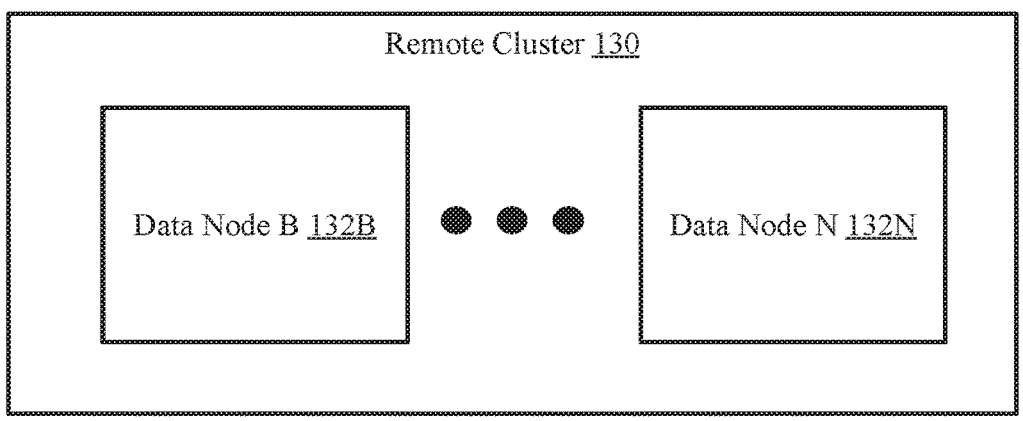
FIG. 1D shows a diagram of a remote cluster in accordance with one or more embodiments of the invention.

FIG. 1D shows a diagram of a remote cluster in accordance with one or more embodiments of the invention. The remote cluster (130) may be an embodiment of the remote cluster (130, FIG. 1A) discussed above. The remote cluster (130) any number of data nodes (132B, 132N). The components of the remote cluster (130) may be operably connected via any combination of wired and/or wireless connections. Each of the aforementioned components is discussed below. The remote cluster (130) may include other and/or additional components without departing from the invention.

In one or more embodiments of the invention, the data nodes (132B, 132N) store data (as described below). The data nodes (132B, 132N) may include persistent storage devices (e.g., see FIG. 1E) that may be used to store the processed data and/or storage metadata. The management of the processed data is described below with respect to FIGS. 3A-3B. The data nodes (132B, 132N) may include the functionality to perform deduplication and undeduplication for the remote cluster (130) without departing from the invention. For additional details regarding the data nodes (132B, 132N), see, e.g., FIG. 1E.

Figure 1E:
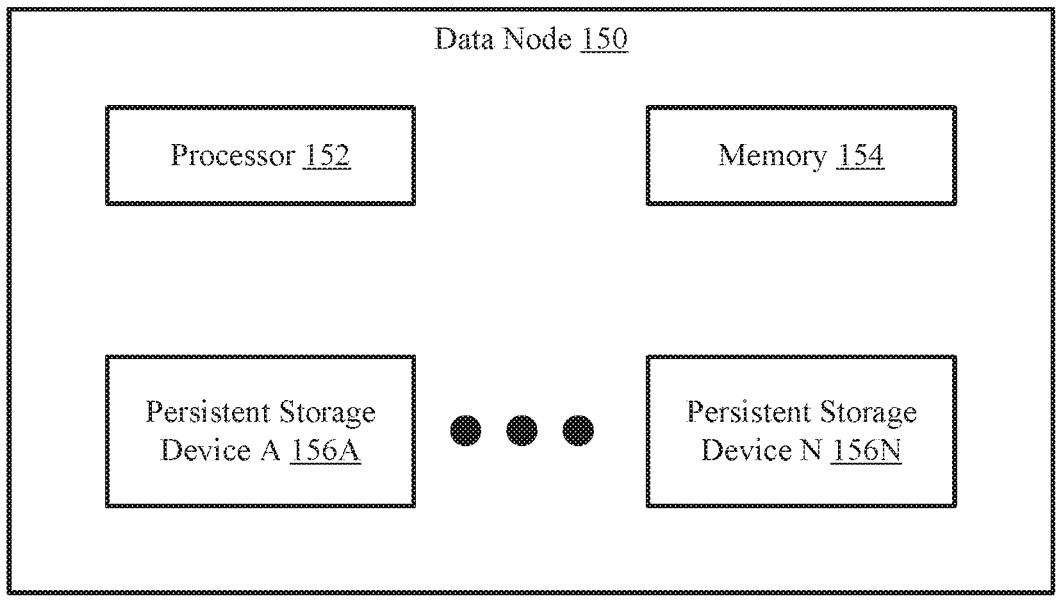
FIG. 1E shows a diagram of a data node in accordance with one or more embodiments of the invention.

FIG. 1E shows a diagram of a data node in accordance with one or more embodiments of the invention. The data node (150) may be an embodiment of the data nodes (114A, 114M, FIG. 1C, 132B, 132N, FIG. 1D) described above. The data node (150) may include a processor (152), memory (154), and one or more persistent storage devices (156A, 156N). Each component of the data node (150) may be operatively connected to each other via wired and/or wireless connections. The data node (150) may have additional, fewer, and/or different components without departing from the invention. Each of the illustrated components of the data node (150) is discussed below.

In one or more embodiments of the invention, the processor (152) is a component that processes data and processes requests. The processor (152) may be, for example, a central processing unit (CPU). The processor (152) may be other types of processors without departing from the invention. The processor (152) may process a request to store data and/or metadata and process data and/or metadata using data stored in memory (e.g., 154), the persistent storage devices (156A, 156N), and/or other data nodes (e.g., 130N, FIG. 1B). The processor (152) may process other requests without departing from the invention.

In one or more embodiments of the invention, the data node (150) includes memory (154), which stores data that is more accessible to the processor (152) than the persistent storage devices (156A, 156N). The memory (154) may be volatile storage. Volatile storage may be storage that stores data that is lost when the storage loses power. The memory (154) may be, for example, Random Access Memory (RAM). In one or more embodiments of the invention, a copy of the storage metadata (128, FIG. 1B) required for undeduplication is stored in the memory (154) of the data node (150).

In one or more embodiments of the invention, the persistent storage devices (156A, 156N) store processed data. The data may be data chunks and/or parity chunks, deduplicated data, compressed data, and/or replicated data. In addition, the data may also include storage metadata. The persistent storage devices (156A, 156N) may be non-volatile storage. In other words, the data stored in the persistent storage devices (156A, 156N) is not lost or removed when the persistent storage devices (156A, 156N) lose power. Each of the persistent storage devices (156A, 156N) may be, for example, solid state drives, hard disk drives, and/or tape drives. The persistent storage devices (156A, 156N) may include other types of non-volatile or non-transitory storage mediums without departing from the invention. For additional information regarding persistent storage devices (156A, 156N), refer to FIG. 1F.

Figure 1F:
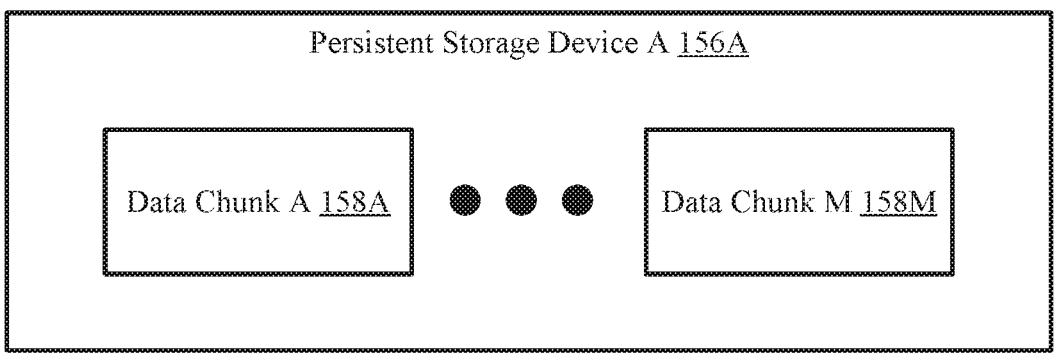
FIG. 1F shows a diagram of a persistent storage device in accordance with one or more embodiments of the invention.

FIG. 1F shows a diagram of a persistent storage device in accordance with one or more embodiments of the invention. The persistent storage device (156A) may be an embodiment of the persistent storage devices (156A, 156N, FIG. 1E) discussed above. As discussed above, the persistent storage device (156) stores data. The data may be data chunks (158A, 158M) (which may or may not be deduplicated). Though not shown in FIG. 1F, the data may also include storage metadata.

In one or more embodiments of the invention, a data chunk (158A, 158M) is a data structure that includes a portion of data that was obtained from a host. The data chunks (158A, 158M) may be unique data chunks that were deduplicated by any component of the system (including data nodes (e.g., 114A, 114M FIG. 1C, 132B, 132N, FIG. 1D)). Each of the data chunks (158A, 158M) may be used by the data node (140) (or another data node) to reconstruct a data file that was deduplicated and stored in the system.

Figure 2:
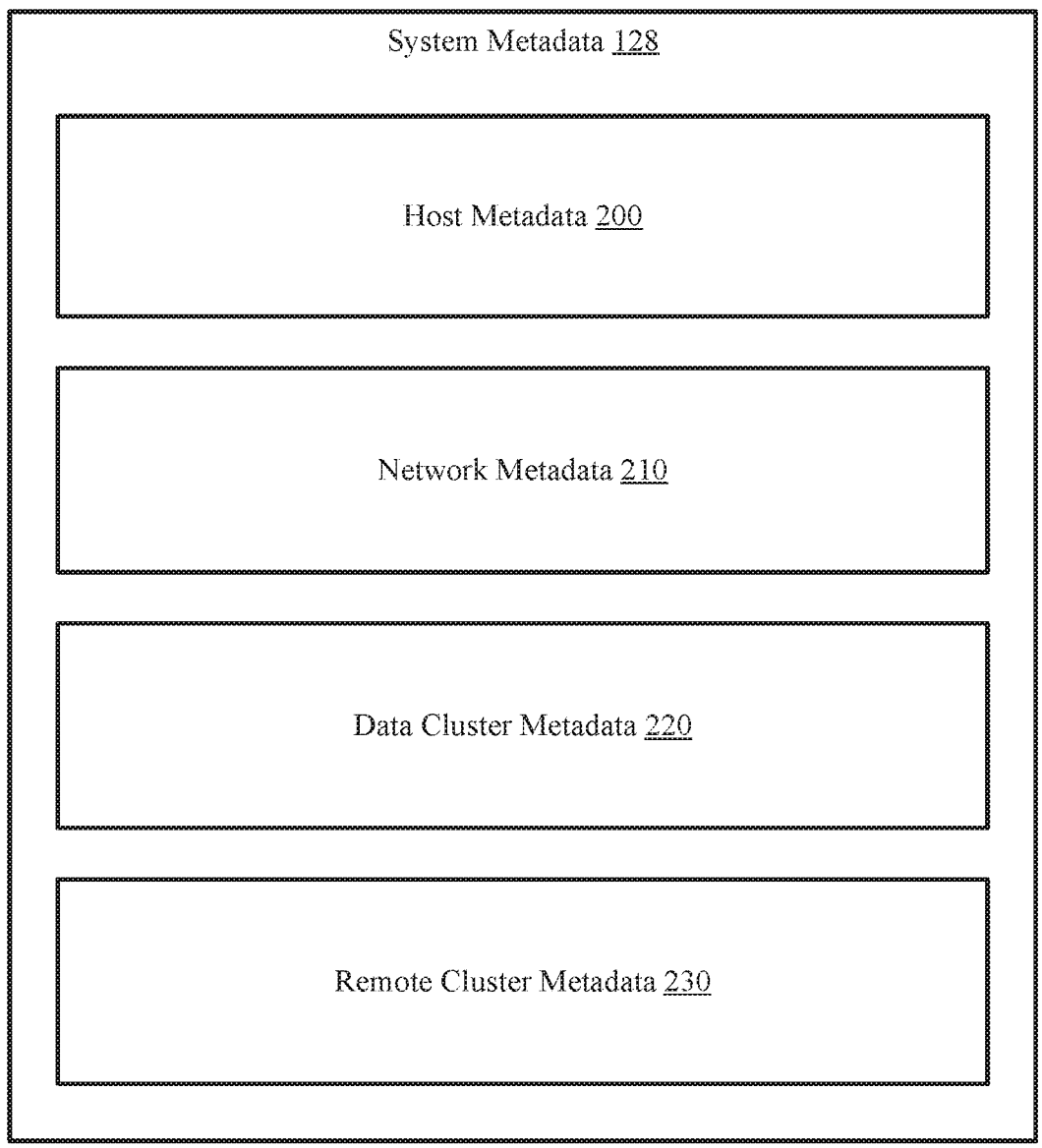
FIG. 2 shows a diagram of system metadata in accordance with one or more embodiments of the invention.

FIG. 2 shows a diagram of system metadata in accordance with one or more embodiments of the invention. The system metadata (126) may be an embodiment of the system metadata (126, FIG. 1B) discussed above. The system metadata (126) may include metadata from each component in the system of FIG. 1A, not including the data manager (120, FIG. 1A). Accordingly, the system metadata (126) may include host metadata (200), network metadata (210), data cluster metadata (220), and remote cluster metadata (230). Each of aforementioned data structures is discussed below.

In one or more embodiments of the invention, the host metadata (200) includes metadata associated with the host (e.g., 100, FIG. 1A). The host metadata (200) may include computational capability information and prior performance information associated with the host (e.g., 100, FIG. 1A). The host metadata (200) may include other and/or additional information without departing from the invention.

The computational capability information may indicate whether the host has the necessary computational resources to perform deduplication and undeduplication. The computational capability information may include, for example, the underlying hardware of the host (e.g., 100, FIG. 1A) and the processing capabilities of the underlying hardware. The computational capability information may include other and/or additional information that indicates whether host (e.g., 100, FIG. 1A) is able to perform deduplication and undeduplication without departing from the invention.

The host metadata (200) may also include prior performance information as discussed above. The prior performance information may include information regarding past deduplication and undeduplication operations performed by the host (e.g., 100, FIG. 1A). The prior performance information may include, for example, latency, throughput, and computational overhead associated with previous deduplication and undeduplication operations. The prior performance information may include other and/or additional information associated with the performance of prior deduplication and undeduplication operations without departing from the invention.

In one or more embodiments of the invention, the network metadata (210) includes metadata associated with the network (e.g., 140, FIG. 1A). The network metadata (210) may include computational capability information and prior performance information associated with the network (e.g., 140, FIG. 1A). The network metadata (210) may include other and/or additional information without departing from the invention.

The computational capability information may indicate whether the network (e.g., 140, FIG. 1A) has the necessary computational resources to perform deduplication and undeduplication. The computational capability information may include, for example, the underlying hardware of the network (e.g., 140, FIG. 1A) and the processing capabilities of the underlying hardware. The computational capability information may include other and/or additional information that indicates whether network (e.g., 140, FIG. 1A) is able to perform deduplication and undeduplication without departing from the invention.

The network metadata (210) may also include prior performance information as discussed above. The prior performance information may include information regarding past deduplication and undeduplication operations performed by the network (e.g., 140, FIG. 1A). The prior performance information may include, for example, latency, throughput, and computational overhead associated with previous deduplication and undeduplication operations. The prior performance information may include other and/or additional information associated with the performance of prior deduplication and undeduplication operations without departing from the invention.

In one or more embodiments of the invention, data cluster metadata (220) includes metadata associated with the data cluster (e.g., 110, FIG. 1A). The data cluster metadata (220) may include computational capability information and prior performance information associated with the data cluster (e.g., 110, FIG. 1A). The data cluster metadata (220) may include other and/or additional information without departing from the invention.

The computational capability information may indicate whether the data cluster (e.g., 110, FIG. 1A) has the necessary computational resources to perform deduplication and undeduplication. The computational capability information may include, for example, the underlying hardware of the data cluster (e.g., 110, FIG. 1A) and the processing capabilities of the underlying hardware. The computational capability information may include other and/or additional information that indicates whether data cluster (e.g., 110, FIG. 1A) is able to perform deduplication and undeduplication without departing from the invention.

The data cluster metadata (220) may also include prior performance information as discussed above. The prior performance information may include information regarding past deduplication and undeduplication operations performed by the data cluster (e.g., 110, FIG. 1A). The prior performance information may include, for example, latency, throughput, and computational overhead associated with previous deduplication and undeduplication operations. The prior performance information may include other and/or additional information associated with the performance of prior deduplication and undeduplication operations without departing from the invention.

In one or more embodiments of the invention, remote cluster metadata (230) includes metadata associated with the remote cluster (e.g., 130, FIG. 1A). The remote cluster metadata (230) may include computational capability information and prior performance information associated with the remote cluster (e.g., 130, FIG. 1A). The remote cluster metadata (230) may include other and/or additional information without departing from the invention.

The computational capability information may indicate whether the remote cluster (e.g., 130, FIG. 1A) has the necessary computational resources to perform deduplication and undeduplication. The computational capability information may include, for example, the underlying hardware of the remote cluster (e.g., 130, FIG. 1A) and the processing capabilities of the underlying hardware. The computational capability information may include other and/or additional information that indicates whether remote cluster (e.g., 130, FIG. 1A) is able to perform deduplication and undeduplication without departing from the invention.

The remote cluster metadata (230) may also include prior performance information as discussed above. The prior performance information may include information regarding past deduplication and undeduplication operations performed by the remote cluster (e.g., 130, FIG. 1A). The prior performance information may include, for example, latency, throughput, and computational overhead associated with previous deduplication and undeduplication operations. The prior performance information may include other and/or additional information associated with the performance of prior deduplication and undeduplication operations without departing from the invention.

FIG. 3A shows a flowchart for storing data in accordance with one or more embodiments of the invention. The method shown in FIG. 3A may be performed by, for example, a storage controller of a data manager (122, FIG. 1B). Other components of the system illustrated in FIGS. 1A and 1B may perform the method of FIG. 3A without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 300, a write request is obtained from a host in a system. The request may include the data in which to write to the system. The data may be a file, a file segment, a collection of files, or any other type of data without departing from the invention.

In step 302, system metadata is obtained from each component of the system. The storage controller of the data manager may send a request to each of the components of the system including the host, data cluster, network, and remote cluster. Upon receiving the request, each component of the system may generate and/or send the corresponding system metadata. Accordingly, the host may send host metadata, the data cluster may send data cluster metadata, the network may send network metadata, and the remote cluster may send remote cluster metadata. The system metadata includes the host metadata, data cluster metadata, network metadata, and the remote cluster metadata as discussed above.

In step 304, a component is chosen to perform deduplication based on the system metadata. In one or more embodiments of the invention, the storage controller of the data manager uses the obtained system metadata to choose the component to perform deduplication. As discussed above, the system metadata may include computational capability information and prior performance information for each component in the system. The computational capability information may indicate whether a component of the system is able to perform deduplication. The prior performance information may be used to determine whether a component performing deduplication is consuming too many computational resources.

For example, the storage controller of the data manager may check the computational capability information of the system metadata and determine that only the network and the data cluster are capable of performing deduplication of the data associated with the write request. The storage controller of the data manager may then check the prior performance information of the system metadata for the network and the data cluster and determine that recent past deduplication operations performed by the network experienced significant latency, harming other operations performed by the network. Based on the information included in the system metadata for this scenario, the storage controller of the data manager may then choose the data cluster to perform deduplication of the data included in the write request.

In step 306, the performance of deduplication at the chosen component is initiated. The storage controller of the data manager may send a request to the necessary components of the system involved in the data pipeline and required to move the data from the host to the chosen component to perform deduplication and then store the deduplicated data. The storage controller of the data manager may then send another request to the chosen component to perform deduplication on the data associated with the write request. The request may include a copy of storage metadata required to perform deduplication. In response to the requests, the necessary components may send the data to the chosen component, the chosen component may then perform deduplication on the data, and then send the deduplicated data to the end of the data pipeline where the deduplicated data is ultimately stored.

The chosen component performing the deduplication may generate a fingerprint for a data chunk (a portion or all of the data obtained from the host) and identify whether the fingerprint matches an existing fingerprint stored in storage metadata (i.e., deduplication metadata). If the fingerprint matches an existing fingerprint, the data chunk may be deleted and mapping information may be updated, as it is already stored in the data cluster, and mapping information may be updated. If the fingerprint does not match any existing fingerprints, the data chunk may be stored as a deduplicated data chunk. Additionally, the fingerprint of each deduplicated data chunk is stored in the storage metadata. Mapping information may be updated in the storage metadata based on the deleted chunks and deduplicated data chunks.

In one or more embodiments of the invention, the deduplicated data chunks collectively make up the deduplicated data. In one or more embodiments of the invention, the deduplicated data chunks are the data chunks that were not deleted during deduplication.

In one or more embodiments of the invention, the component chosen to perform deduplication generates storage metadata and sends the generated storage metadata to the data manager where the storage metadata is updated to include the storage metadata generated during the deduplication operation. Additionally, the component that stores the deduplicated data may then generate storage metadata (e.g., storage locations) and send the storage metadata to the data manager, which updates the storage metadata to include the generated storage metadata.

The method may end following step 306.

FIG. 3B shows a flowchart for providing data in accordance with one or more embodiments of the invention. The method shown in FIG. 3B may be performed by, for example, a storage controller of a data manager (122, FIG. 1B). Other components of the system illustrated in FIGS. 1A and 1B may perform the method of FIG. 3B without departing from the invention. While the various steps in the flowchart are presented and described sequentially, one of ordinary skill in the relevant art will appreciate that some or all of the steps may be executed in different orders, may be combined or omitted, and some or all steps may be executed in parallel.

In step 310, a request to access deduplicated data stored on a data node of a data cluster is obtained from a remote cluster in a system. The deduplicated data may be all or a portion of a file and include one or more deduplicated data chunks stored in the data cluster.

In step 312, system metadata is obtained from each component of the system. The storage controller of the data manager may send a request to each of the components of the system including the host, data cluster, network, and remote cluster. Upon receiving the request, each component of the system may generate and/or send the corresponding system metadata. Accordingly, the host may send host metadata, the data cluster may send data cluster metadata, the network may send network metadata, and the remote cluster may send remote cluster metadata. The system metadata includes the host metadata, data cluster metadata, network metadata, and the remote cluster metadata as discussed above.

In step 314, a component of the system is chosen to perform undeduplication of deduplicated data based on the system metadata. In one or more embodiments of the invention, the storage controller of the data manager uses the obtained system metadata to choose the component to perform undeduplication. As discussed above, the system metadata may include computational capability information and prior performance information for each component in the system. The computational capability information may indicate whether a component of the system is able to perform undeduplication. The prior performance information may be used to determine whether a component performing past undeduplication operations is consuming too many computational resources.

For example, the storage controller of the data manager may check the computational capability information of the system metadata and determine that only the network and the data cluster are capable of performing undeduplication of the data associated with the access request obtained in step 310. The storage controller of the data manager may then check the prior performance information of the system metadata for the network and the data cluster and determine that recent past undeduplication operations performed by the network experienced significant latency, harming other operations performed by the network. Based on the information included in the system metadata for this scenario, the storage controller of the data manager may then choose the data cluster to perform undeduplication of the data included in the access request.

In step 316, the performance of undeduplication of deduplicated data at the chosen component is initiated. The storage controller of the data manager may send a request to the necessary components of the system involved in the data pipeline and required to move the data from the host to the chosen component to perform undeduplication and then provide the undeduplicated data. The storage controller of the data manager may then send another request to the chosen component to perform undeduplication on the data associated with the access request. The request may include a copy of storage metadata required to perform undeduplication. In response to the requests, the necessary components may send the deduplicated data to the chosen component, the chosen component may then perform undeduplication on the deduplicated data, and then send the undeduplicated data to the end of the data pipeline where the undeduplcated data is ultimately stored.

The storage controller may use the storage metadata to identify the deduplicated chunks associated with the access request and notify the component in which they are stored to include copies of the identified deduplicated chunks in the data sent to the chosen component to perform undeduplication. The chosen component performing the undeduplication may generate undeduplicated data using the identified deduplicated chunks. The chosen component may then send the undeduplicated data to the end of the data pipeline.

The method may end following step 316.

EXAMPLE

Figure 4A:
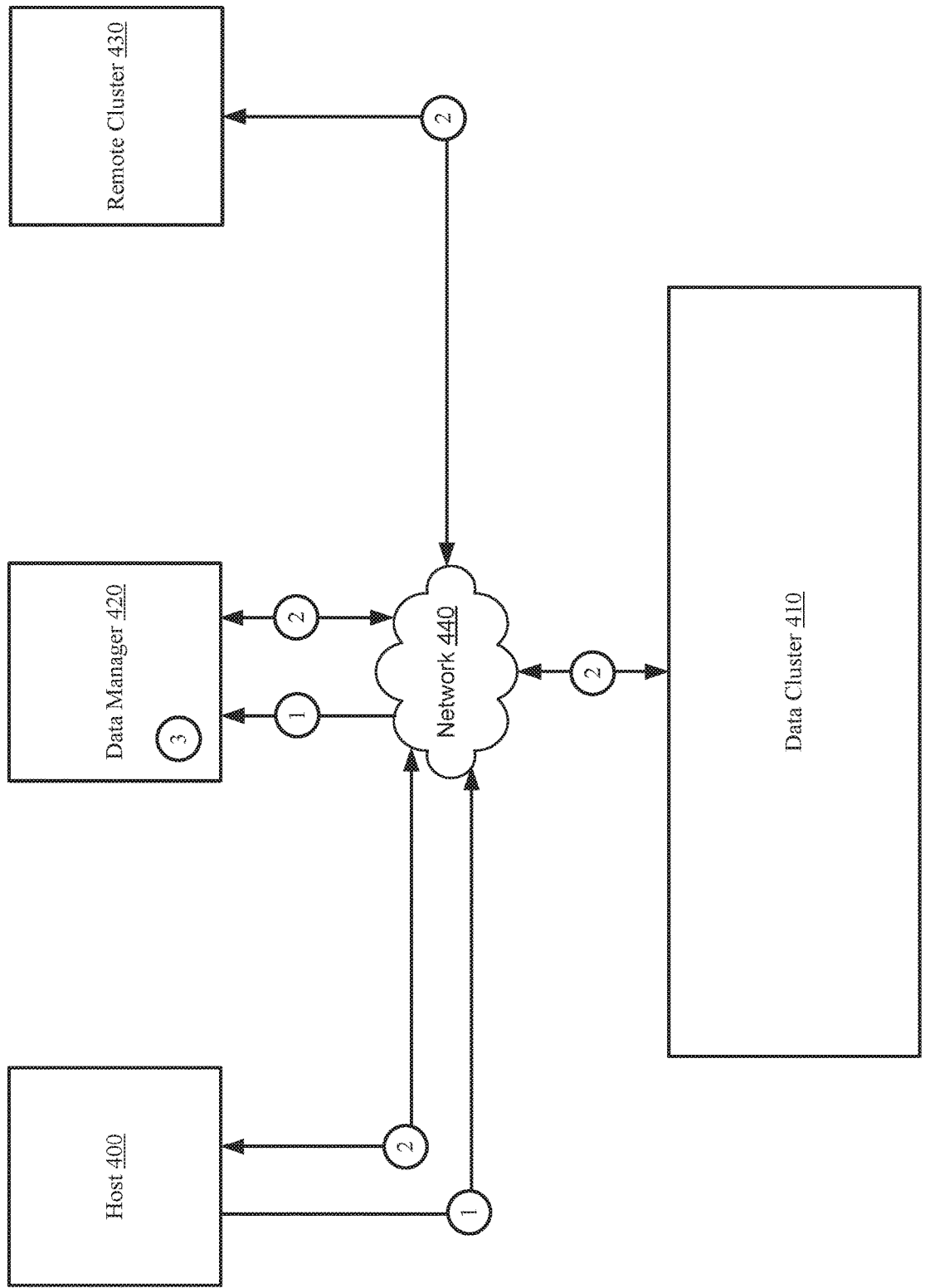

The following sections describe two examples. The examples are not intended to limit the invention. FIGS. 4A-4B show a first example in accordance with one or more embodiments of the invention. Turning to the first example, consider a scenario in which a data manager obtains a write request from a host. The host requests data to be stored in the data cluster. FIG. 4A shows a diagram of a first example system in accordance with one or more embodiments of the invention. Each component of the system is connected via a network (440). The host (400) sends the request to a data manager (420) through the network (440) [1]. The data manager (420) then sends a request to each component in the system including the host (400), the data cluster (410), the remote cluster (430), and the network (440) to obtain system metadata from each component. In response to the request, each component (400, 410, 430, 440) sends storage metadata to the data manager (420) [2]. The data manager (420) then chooses the data cluster (410) to perform deduplication on the data associated with the write request of the host (400) based on the obtained system metadata and to store the resulting deduplicated data [3].

Turning to FIG. 4B, the data manager (420) sends a request to the host (400), the network (440) and the data cluster (410) to move the data associated with the write request to the data cluster (410), and that the data cluster (410) was chosen to perform deduplication on the data [4]. The host (400) then sends the data to the network (440), which then sends the data to the data cluster (410) [5]. The data cluster (410) then performs deduplication on the obtained data and stores the deduplicated data [6].

Figure 4C:
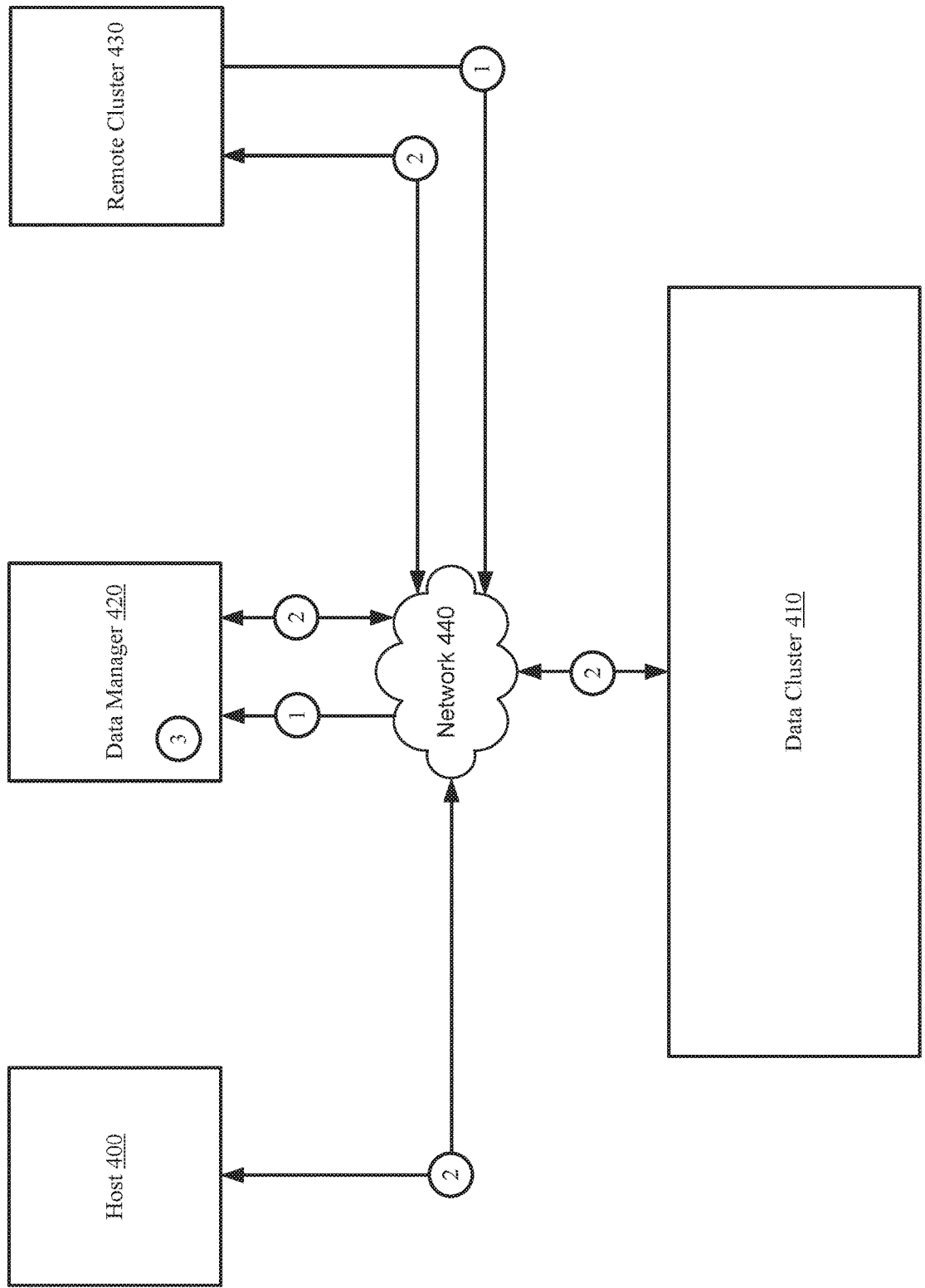
FIGS. 4C-4D show a second example in accordance with one or more embodiments of the invention.
Figure 4D:
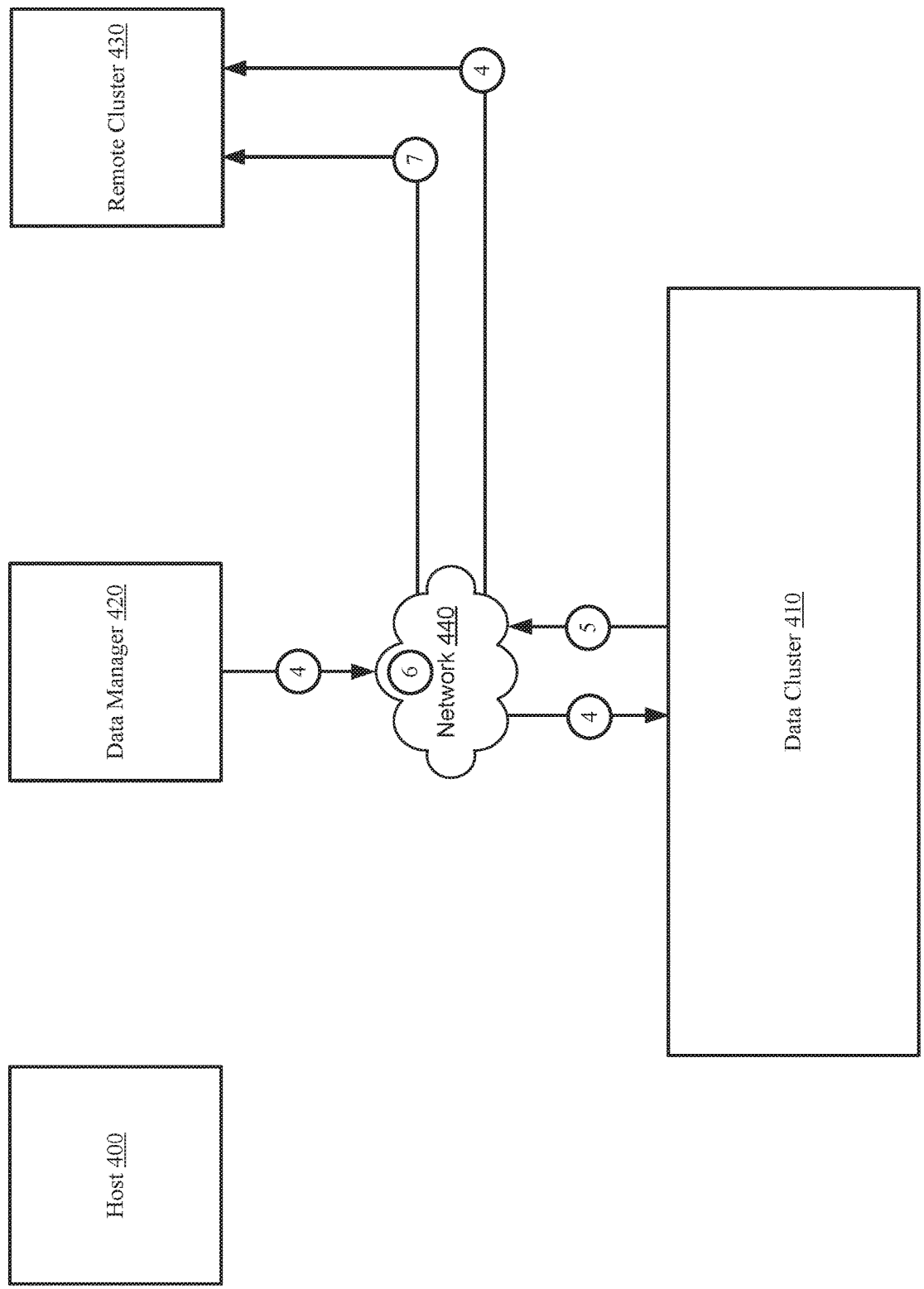

FIGS. 4C-4D show a second example in accordance with one or more embodiments of the invention. Turning to the second example, consider a scenario in which a data manager obtains an access request from a remote cluster. The remote client requests deduplicated data that is stored in the data cluster. FIG. 4C shows a diagram of a second example system in accordance with one or more embodiments of the invention. Each component of the system is connected via a network (440). The remote cluster (430) sends the request to a data manager (420) through the network (440) [1]. The data manager (420) then sends a request to each component in the system including the host (400), the data cluster (410), the remote cluster (430), and the network (440) to obtain system metadata from each component. In response to the request, each component (400, 410, 430, 440) sends storage metadata to the data manager (420) [2]. The data manager (420) then chooses the network (440) to perform deduplication on the data associated with the write request of the host (400) based on the obtained system metadata[3].

Turning to FIG. 4D, the data manager (420) sends a request to the remote cluster (430), the network (440) and the data cluster (410) to move the data associated with the write request to the data cluster (410), and that the network (440) (e.g., a component of the network, such as the network switch) is chosen to perform undeduplication on the deduplicated data [4]. The data cluster (410) then sends the deduplicated data to the network (440) [5]. The network (440) then performs undeduplication on the deduplicated data resulting in undeduplicated data [6]. The network (440) then sends the undeduplicated data to the remote cluster (430) where the undeduplicated data is stored [7].

End of Example

As discussed above, embodiments of the invention may be implemented using computing devices. FIG. 5 shows a computing system in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506).

Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention the efficiency of storing data in a data cluster. In one embodiment of the invention, the reliability and efficiency is improved by performing deduplication and undeduplication of data in a system at any component in the system. Embodiments of the invention include a data manager that uses system metadata to choose which component of the system to perform deduplication and undeduplication.

In traditional systems, deduplication and undeduplication are performed on a single component of the system. Embodiments of the invention improve the traditional data clusters selecting any component of the system to perform deduplication and undeduplication based on system metadata. As a result, the latency and computational efficiency required to deduplication and undeduplication in a system are optimized.

Thus, embodiments of the invention may address the problem of inefficient use of computing resources. This problem arises due to the technological nature of the environment in which data is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for processing data in a system, the method comprising:
   receiving, by a data manager, a write request from a host, wherein the write request specifies the data, wherein components of the system comprise the host, the data manager, a data cluster, and a remote cluster;
   in response to the write request, obtaining, by the data manager, system metadata associated with each of the components, wherein obtaining the system metadata comprises:
      sending a request to the host to obtain host metadata,
      sending a request to the data cluster to obtain data cluster metadata, and
      sending a request to the remote cluster to obtain remote cluster metadata,
      wherein the system metadata comprises the host metadata, the data cluster metadata, and the remote cluster metadata;
   selecting, based on the system metadata, a selected component of the components to perform a data processing operation, wherein the system metadata specifies that the selected component is capable of performing the data processing operation;
   initiating transfer of the data from the host to the selected component;
   initiating the data processing operation on the selected component, wherein the selected components applies the data processing operation to the data to generate processed data and wherein the processed data is stored in one selected from a group consisting of the data cluster and the remote cluster.

2. The method of claim 1, wherein the selected component is a network element.

3. The method of claim 2, wherein the system metadata further comprises network metadata obtained from the network element.

4. The method of claim 1, wherein the data processing operation is a deduplication operation.

5. A system, comprising:
   a processor;
   a data manager, which when executed by the processor performs a method, the method comprising:
      receiving a write request from a host, wherein the write request specifies data, wherein components of the system further comprise the host a data cluster, and a remote cluster;
      in response to the write request, obtaining, system metadata associated with each of the components, wherein obtaining the system metadata comprises:
         sending a request to the host to obtain host metadata,
         sending a request to the data cluster to obtain data cluster metadata, and
         sending a request to the remote cluster to obtain remote cluster metadata,
         wherein the system metadata comprises the host metadata, the data cluster metadata, and the remote cluster metadata;
      selecting, based on the system metadata, a selected component of the components to perform a data processing operation, wherein the system metadata specifies that the selected component is capable of performing the data processing operation;
      initiating transfer of the data from the host to the selected component;
      initiating the data processing operation on the selected component, wherein the selected components applies the data processing operation to the data to generate processed data and wherein the processed data is stored in one selected from a group consisting of the data cluster and the remote cluster.

6. The system of claim 5, wherein the selected component is a network element.

7. The system of claim 6, wherein the system metadata further comprises network metadata obtained from the network element.

8. The system of claim 5, wherein the data processing operation is a deduplication operation.

9. A non-transitory computer readable medium comprising computer readable program code, which when executed by a computer processor enables the computer processor to perform a method, the method comprising:
   receiving, by a data manager, a write request from a host, wherein the write request specifies the data, wherein components of a system comprise the host, the data manager, a data cluster, and a remote cluster;

in response to the write request, obtaining, by the data manager, system metadata associated with each of the components, wherein obtaining the system metadata comprises:
sending a request to the host to obtain host metadata,
sending a request to the data cluster to obtain data cluster metadata, and
sending a request to the remote cluster to obtain remote cluster metadata,
wherein the system metadata comprises the host metadata, the data cluster metadata, and the remote cluster metadata;

selecting, based on the system metadata, a selected component of the components to perform a data processing operation, wherein the system metadata specifies that the selected component is capable of performing the data processing operation;

initiating transfer of the data from the host to the selected component;

initiating the data processing operation on the selected component, wherein the selected components applies the data processing operation to the data to generate processed data and wherein the processed data is stored in one selected from a group consisting of the data cluster and the remote cluster.

10. The non-transitory computer readable medium of claim 9, wherein the selected component is a network element.

11. The non-transitory computer readable medium of claim 10, wherein the system metadata further comprises network metadata obtained from the network element.

* * * * *

UNITED STATES PATENT AND TRADEMARK OFFICE
CERTIFICATE OF CORRECTION

PATENT NO. : 11,175,842 B2  
APPLICATION NO. : 16/810936  
DATED : November 16, 2021  
INVENTOR(S) : Dharmesh M. Patel, Ravikanth Chaganti and Rizwan Ali Page 1 of 1

It is certified that error appears in the above-identified patent and that said Letters Patent is hereby corrected as shown below:

In the Drawings

FIG. 2, delete the phrase "System Metadata 128" and insert -- System Metadata 126 --.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*